United States Patent
Svensson

[11] Patent Number: 5,791,214
[45] Date of Patent: Aug. 11, 1998

[54] COMBINED PARTING TOOL AND MATERIAL FEEDING ARRANGEMENT

[76] Inventor: Bo Karl Ragnar Svensson, Nybrogatan 75, 114 40 Stockholm, Sweden

[21] Appl. No.: 624,512

[22] PCT Filed: Nov. 1, 1994

[86] PCT No.: PCT/SE94/01024

§ 371 Date: Apr. 5, 1996

§ 102(e) Date: Apr. 5, 1996

[87] PCT Pub. No.: WO95/13159

PCT Pub. Date: May 18, 1995

[30] Foreign Application Priority Data

Nov. 2, 1993 [SE] Sweden ............... 9303578

[51] Int. Cl.$^6$ ............................................. B23B 3/00
[52] U.S. Cl. ..................... 82/1.11; 82/47; 82/102; 82/124; 82/127; 407/117
[58] Field of Search ............... 82/127, 157, 102, 82/1.11, 47, 124, 125, 126, 162; 407/1, 117

[56] References Cited

U.S. PATENT DOCUMENTS

| | | | |
|---|---|---|---|
| 3,182,534 | 5/1965 | Hoffmann | 82/157 |
| 4,464,958 | 8/1984 | Luks | 82/2.5 |
| 4,522,091 | 6/1985 | Toffolon | 82/38 R |
| 4,754,671 | 7/1988 | Toffolon | . |
| 5,165,313 | 11/1992 | Karr | 82/127 |

FOREIGN PATENT DOCUMENTS

| | | | |
|---|---|---|---|
| 138412 | 10/1979 | Germany | 82/124 |
| 155149 | 5/1982 | Germany | 82/124 |
| 3619153 | 12/1987 | Germany | . |
| 884867 | 11/1981 | U.S.S.R. | 82/124 |

*Primary Examiner*—A. L. Pitts
*Assistant Examiner*—Christopher Kirkman

[57] ABSTRACT

The present invention relates to a tool arrangement (5) which includes a parting tool (6) or the like which is intended to cut off or remove a machined section from the raw material (3) held firmly in a holding device (2). Located adjacent the parting tool (5, 6) on the side thereof that is proximal to the raw material (3) is a bifurcate device (7) which is intended to coact with the edge region (3b, 6b) of the raw material that lies proximal to the machined section, at least when parting of the machine section (3a) is completed, so that upon axial movement of the parting tool and/or bifurcate device a given length of raw material will be withdrawn from the holding device (2). The invention also relates to a method of moving the raw material out of the holding device.

18 Claims, 2 Drawing Sheets

COMBINED PARTING TOOL AND MATERIAL FEEDING ARRANGEMENT

TECHNICAL FIELD

The present invention relates to a tool arrangement and then more particularly, but not exclusively, to a tool arrangement of the kind which includes a parting or cutting-off tool or a tool which fulfills a similar function.

Parting tools, or cutting-off tools, are intended to separate a machined section of raw material held in (a chuck) a holding device, wherein the machined section is related to one end of the still unworked raw material.

The worked or machined section of the raw material is parted from the remainder of the raw material by rotating the parting tool and/or the raw material while moving the parting tool and/or the raw material towards one another, so that the tool moves towards an axially extending center line of the rotary movement and therewith cut a channel or a groove, normally a narrow channel, between the machined section and the unworked raw material in towards, and normally beyond the aforesaid centerline.

DESCRIPTION OF THE PRIOR ART

There are known to the art several different types of tool arrangements that are adapted for numerically controlled cutting machines, such as program controlled lathes, for instance a CNC-Lathe.

With regard to the present invention, it is known to use a tool arrangement which includes a parting or cutting-off tool or a tool having a corresponding function and which is intended to remove a machined section of a workpiece or raw material held in a lathe chuck.

It is also known to the art to fit to the revolving head of a program controlled working machine which is intended to accommodate a plurality of tool rays specific tools of which one is intended to remove a machined section of a workpiece, another is intended to move forwards an unworked length of the raw material immediately after having separated the machined section of the raw material, and others are intended to create conditions whereby after removing the machined section the chuck-held raw material can be moved to a position in which a section of the unworked raw material can be machined while allowing the holding device or chuck to hold the unworked section in this new position. Normally, the unworked section of the raw material or the workpiece is moved by a first set of tools and machined by a second or several second sets of tools, and then parted or cut-off in another machining stage by means of a further set of tools. This method is highly time consuming.

The prior publications SU-1222-540-A, U.S. Pat.No. 3,981,673, U.S. Pat. No. 2,381,657 and GB-A-966644 teach examples of the earlier known state of the art with regard to holding devices which function to move raw material that is being machined.

SUMMARY OF THE INVENTION TECHNICAL PROBLEMS

When considering the known state of the art as described above it will be seen that a technical problem resides in realizing the advantages that are gained when a tool arrangement including a parting tool or like tool which enables the raw material which was previously held firmly by a holding device and which is now loosened to be moved to a new machining position immediately after the parting-operation or parting sequence without needing to make a tool change and thereafter be clamped firmly by the holding device and a section of the raw material is machined in accordance with a set program with the aid of one or more tools in the set of tools mounted in the revolver head or in the tool revolver.

It will also be seen that a technical problem resides in realizing the possibilities that are afforded by the use of a bifurcate or U-shaped device which is located adjacent the parting tool on the side thereof proximal to the raw material and which coacts with said raw material.

Another technical problem is one of realizing that after cutting-off the machined section and after the raw material has ceased to rotate the bifurcate device shall be caused to coact with an edge region of the raw material that lies proximal to the machined section of the raw material or workpiece so that upon axial displacement of the parting tool and the bifurcate device and upon loosening of the raw material from the holding device a given length of raw material will be moved out of and away from the holding device.

It will also be seen that a technical problem resides in realizing the significance of allowing the aforesaid bifurcate to have the form of a unit which can be firmly attached to the parting tool but easily removed therefrom.

It will also be seen that a technical problem is one of realizing the significance of constructing the bifurcate device in the form of one fixed or two relatively adjustable legs and enabling the leg or the legs to be connected firmly to a holder but readily removable therefrom.

It will also be seen that a technical problem is one of realizing that the bifurcate device may be formed integrally with the parting tool and that the embodiment chosen from the proposed embodiments can be used beneficially for one of a number of different applications and for one of several and conceivably different machined sections of the raw material or workpiece.

It will also be seen that a technical problem resides in providing a bifurcate device which is constructed of two parts, of which at least one part shall be adjustable away from and towards the other so as to enable the distance between the legs to be adjusted to the diameter of the raw material or the like.

Another technical problem is one of realizing the significance of spacing the mutually facing parts or surfaces of said parts of the bifurcate device so that the distance therebetween will be much smaller than the outer dimensions of the raw material.

It will also be seen that a technical problem resides in realizing that the two parts of the bifurcate device shall be capable of being fixed in relation to one another as a unit.

It will also be seen that a technical problem is one of realizing that it shall be possible to adjust the distance between the aforesaid parts of the bifurcate device to a distance which is smaller than the outer dimensions of the raw material, so that the device can be inserted with a force fit.

Another technical problem is one of being able to realize the simplicity of giving each of the legs of the aforesaid parts of the bifurcate device an L-shape, with one leg of each L-shaped part adapted for coaction with the edge region of the raw material and respective other legs of said L-shaped part adapted for coaction with one another, preferably through the medium of serrations and with the aid of a fastener or clamping means.

In the case of a tool arrangement of the aforedescribed kind and used in a tool machine, a technical problem resides in providing a method of moving raw material that was held firmly in a holding device but which is now released to a position in which the raw material can be machined as desired, and then clamp the raw material in the holding device, wherein a parting tool or the like is adapted to cut-off a machined section of the raw material, and therewith realize the advantages that are associated with allowing the parting tool to first form in the raw material a circular peripheral groove positioned adjacent a parting section and adapted for successive coaction with a bifurcate device which is brought successively into coaction with said groove during the parting or cutting-off process, and wherein after the machined section has been cut-off the raw material is loosened from the holding device and is brought from the holding device to its chosen position by virtue of the common movement of the bifurcate device and the parting tool and is clamped in this position for renewed machining of the part of the raw material thus withdrawn from the holding device.

It will also be seen that a technical problem is one of realizing the possibilities that are afforded when the bifurcate device can be caused to coact successively with the periphery of the raw material, preferably a machined peripheral surface thereof, during a cutting-off process with the aid of the parting tools, and after cutting-off the machined section move the bifurcate device into clamping coaction with stationary raw material and thereafter loosen the raw material from the holding device whereafter the common movement of the bifurcate device and/or the parting tool away from the holding device is effective to move the raw material to a selected position and is again clamped by the holding device in this position.

It will also be seen that a technical problem resides, at least in this latter application, in realizing the necessity of allowing the distance between the mutually opposing surfaces of the bifurcate device to be only slightly shorter than the distance between the mutually parted surface parts of the raw material, so as to obtain an adapted squeezing action between the surfaces of the bifurcate device and the outer parts of the raw material such that the raw material will accompany the common movement of the bifurcate device and the parting tool away from the holding device.

It will also be seen that a technical problem is one of providing conditions with the aid of simple means which will enable a tool site in the tool revolver to be left free by combining the cutting-off or parting function and the forward feed function in one and the same tool set-up.

SOLUTION

With the intention of providing a solution to one or more of the aforesaid technical problems, the present invention is based on a tool arrangement which includes a parting tool for parting-off and/or removing a machined section from raw material held by a holding device, by assigning to the parting tool and/or to said raw material a rotary movement while displacing the parting tool relative to the raw material and preferably beyond an axially extending center line assigned to the rotary movement, and therewith cut a groove between said section and said raw material.

According to the present invention there is provided adjacent the parting tool and the side proximal to the raw material a bifurcate device which is intended to coact with the edge region of the raw material that lies proximal to the machined section, at least after cutting-off is completed, such that when loosening raw material from the holding device and in response to common axial movement of the parting tool and the bifurcate device a given length of raw material will be withdrawn from the holding device.

According to proposed embodiments which lie within the scope of the present invention, the bifurcate device, or parts thereof, is/are comprised of a unit which is firmly attached to the parting tool and which can be easily removed therefrom, or, alternatively, the bifurcate device is comprised of a unit which is formed integrally with the parting tool.

It is also proposed that the bifurcate device is divided as a unit, a holder and one or more parts or legs which is firmly connected to the holding device but readily removed therefrom.

According to one embodiment, the bifurcate device is comprised of two parts which are preferably adjustable towards and away from one another.

It is particularly proposed that the mutually facing parts or surfaces of said parts can be adjusted so that the distance there between will be well short of the outer dimensions or outer surfaces of the raw material. In this regard, the aforesaid one or two parts of the bifurcate device may be fixed, as a unit, in relation to one another with a given distance between the surfaces of the legs.

The aforesaid possibilities also provide a particular dimensioning facility, insofar that the distance between the parts or the surfaces of said parts can be set to a value which is smaller than the outer dimensions of the raw material, whereby the bifurcate device can be inserted with a press fit.

According to one embodiment of the invention, each of the aforesaid parts of the device may have an L-shape and one leg of each said part may be adapted for coaction with the edge region of the raw material, while receptive other legs of said parts are arranged for coaction with one another, preferably through the medium of serrations or the like, via a fastener or clamping means.

The invention also includes a number of methods for moving raw material which was earlier held firmly be a holding device and which was loosened during the aforesaid forward movement, to a position in which the raw material can be worked or machined as intended and in which the material is again held firmly by the holding device, wherein a parting tool is adapted to remove a machined section, preferably while using a tool arrangement of the afore-described kind which has been successful in solving one or more of the aforesaid technical problems.

According to a first embodiment of the invention, the parting tool shall be caused to cut a groove in the raw material which is positioned adjacent a final parting-off section and which is intended for loose or firmer coaction with a bifurcate device.

During a parting-off sequence, the bifurcate device is moved into successive or gradual coaction with the groove and upon completion of a parting-off or cutting-off process the raw material is loosened from the holding device and moved axially by virtue of the common axial movement of the bifurcated device and the parting-off tool to a chosen position and is there clamped firmly by the holding device for subsequent machining of the thus outwardly drawn section of the raw material.

According to a second embodiment of the invention, during a parting-off process effected with the aid of the parting-off tool a bifurcate device is brought successively into coaction with the peripheral surface of the raw material and not until cutting-off has been completed is the rotary movement stopped and the bifurcate device brought to final coaction with the raw material, whereafter the raw material is loosened from the holding device and caused to move axially to a chosen position by virtue of the common axial movement of the bifurcate device and the parting tool, wherewith the raw material is clamped firmly by the holding device in said position.

Particularly in the case of this latter application it is proposed in accordance with the present invention that the distance between the mutually opposed surfaces of the bifurcate device will be only slightly smaller than the distance between the separated surface parts assigned to the raw material or the groove, so as to provide for a press fit and therewith a clamping action between the bifurcate device and the raw material such that said material will accompany the common axial movement of the bifurcate device and the parting tool as they move away from the holding device.

ADVANTAGES

The advantages that are primarily characteristic of an inventive tool arrangement and which are afforded when this tool arrangement is used in one of the methods according to the present invention reside in the provision of conditions which will enable a program controlled material machining unit to increase its production rate by combining the functional sequences of cutting-off a machined section from raw material with a bifurcate device which coacts with the parting-off tool and which provides conditions whereby raw material can be moved from a holding device, or chuck, to a chosen position for machining of the raw material, without needing to make a tool change.

In addition, the invention also provides time saving because the parting-off tool need not return to a tool revolver rest positions and also provide the possibility of saving a tool accommodating location.

The primary characteristic features of an inventive tool arrangement are set forth in the characterizing clause of the following claim 1. The main characterizing features of two different methods of moving raw material which is firmly held in a holding device but which during movement of the parting tool and bifurcate device is loosened therefrom to a position in which the raw material can be selectively machined are set forth in the characterizing clauses of the following claims 10 and 11 respectively.

BRIEF DESCRIPTION OF THE DRAWINGS

A tool arrangement having characteristic features significant of the present invention will now be described in more detail with reference to the accompanying drawings, in which.

A DETAILED DESCRIPTION OF EMBODIMENTS AT PRESENT PREFERRED

Figure 1:
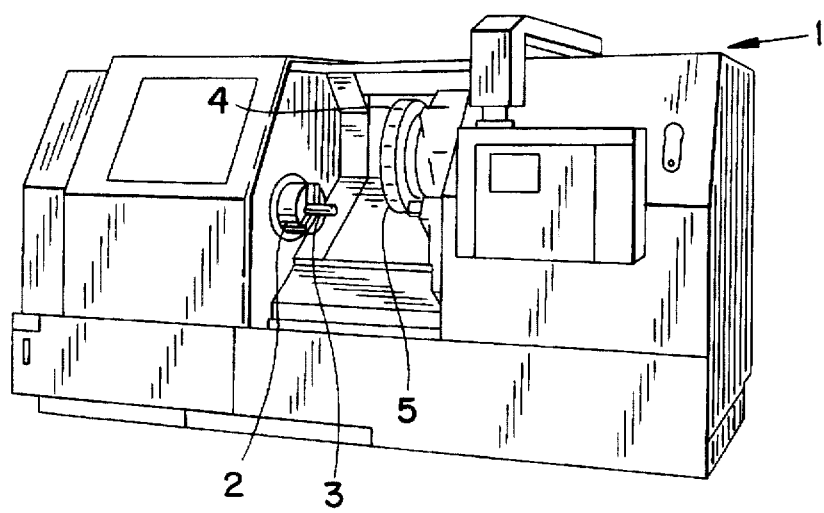
FIG. 1 is a perspective view of a program controlled machine in the form of a CNC-lathe.
Figure 2:
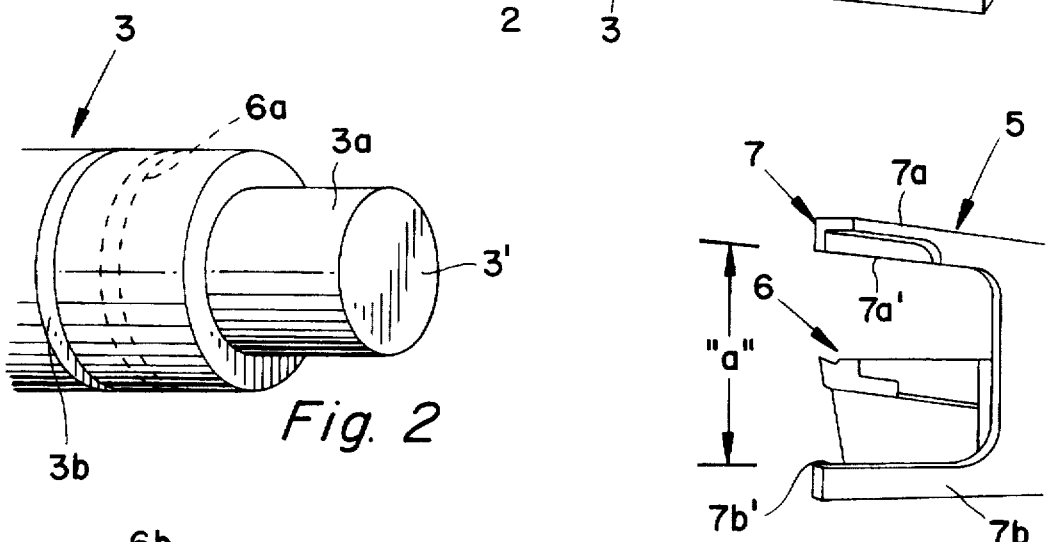
FIG. 2 is a perspective view of raw material having a machined end section.

FIG. 1 is a perspective view of a numerically controlled machine tool in the form of a CNC-lathe 1 having a holding device in the form of a chuck 2 which is intended to clamp the raw material or workpiece to be machined. The raw material 3 may be a "surface true" raw material 3 or a raw material whose peripheral surface has been machined.

The raw material 3 is normally round or rod-like material.

The lathe 1 also includes a tool holder 4 which is intended to hold a plurality of tool set-ups, which are chosen with regard to the form and surface structure of a section to be machined, among other things.

The holder 4 may advantageously have the form of an assembly known as a "tool revolver".

The present invention takes as its starting point one of a plurality of useable tool set-ups. One such set-up is referenced 5 and includes a shaft or an attachment 5' and a parting tool or cutting-off tool 6 which has the form of a hard carbide steel plate and which is held firmly in the attachment, and a bifurcate or U-shaped 7 which will be described in more detail below.

However, the tool set-up or arrangement 5 includes a parting tool 6 or the like which is intended for use in parting a machined section 3a from the raw material 3 held in the chuck 2.

This is effected by assigning to the parting tool 6 and/or the raw material a rotary movement while moving the parting tool 6 relative to the raw material 3 perpendicularly in towards an axially extending center line 3' of the rotary movement, and therewith cut between said section and said raw material a successively deeper groove 6a.

In the present case, the parting tool 6 is fixed and the raw material 3 is rotated by the chuck 2 as the parting tool 6 is moved in towards the axially extending center line 3' of the rotary movement, wherewith the forward part 6 or the cutting edge 6' of the parting tool cuts a groove 6a in the raw material between the machined section 3a and the remainder of the raw material 3, such that the machined section will obtain a given length "L".

A bifurcate device 7, which is illustrated more clearly in the following figures, is located adjacent the parting tool 5, including its forward part 6, on the side thereof that is proximal to the raw material, wherein the bifurcate device 7 is intended to coact mechanically with the edge-region of the raw material 3 that lies proximal to the machined section 3a, at least when parting of the machined section 3a has been completed.

Upon completion of a cutting-off process, the bifurcate device 7 will accompany movement of the parting tool through a further distance at right angles to the rotational axis 3', to a point beyond the center 3' so as to be brought into mechanical coaction with the raw material, with the raw material 3 now stationary.

The raw material 3 is then loosened from its clamping coaction with the holding device or chuck 2.

As the parting tool 5,6 and the bifurcate device 7 are moved axially in the direction of the arrow P, a given length of raw material 3 will be withdrawn from the holding device or chuck 2.

Figure 4:
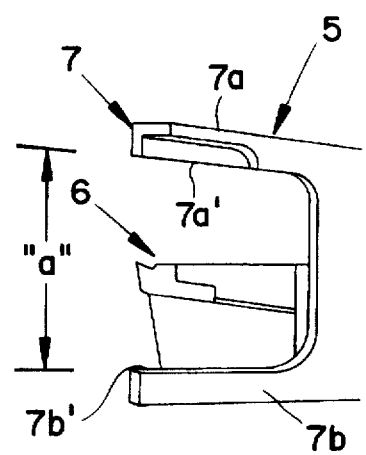
FIG. 4 is a perspective view of the font part of a first embodiment of a tool arrangement in which the bifurcate device is comprised of a unit integrated with the parting tool.

In the case of the embodiment illustrated in FIG. 4, the bifurcate device 7 is comprised of a unit integrated with the parting tool 5, 6.

In the illustrated case the bifurcate or U-shaped device includes legs 7a, 7b whose mutually opposing leg surfaces 7a' and 7b' are spaced apart by a given distance "a".

Such an embodiment can be expected to have only a limited application.

Figure 5:
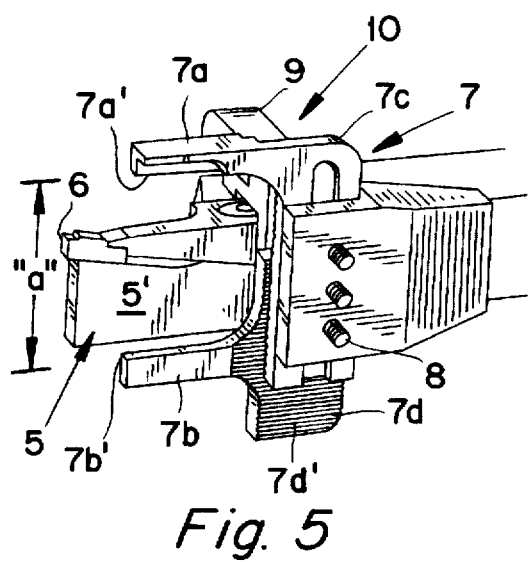
FIG. 5 is a perspective view of the front part of a tool arrangement according to a second embodiment in which the bifurcate device is comprised of a unit which can be firmly connected and readily removed from the parting-tool.

A more flexible embodiment is shown in FIG. 5.

FIG. 5 shows a bifurcate device 7 which is comprised of a unit 10 that can be attached firmly to the parting tool 5, 6 and readily removed therefrom.

In this case, the two parts 7a, 7b of the bifurcate device 7 can be adjusted towards and away from one another so as to decrease and increase the distance "a" between the mutually opposing legs surfaces 7a' and 7b' and therewith adapt the parts to the diameter of a groove 6b and/or a surface part 3b of the raw material.

In both applications, the mutually facing parts or surfaces 7a', 7b' of the legs 7a, 7b of the bifurcate device can be adjusted to a distance "a" which is far smaller than the outer dimensions of the raw material 3 (so that the device can be loosely inserted into the groove 66).

Alternatively, the distance "a" between the surfaces 7a', 7b' of the legs or part 7a, 7b of the bifurcate device may be spaced apart at a distance which is only slightly smaller than the outer dimensions of the raw material 3, either within the groove 6b or the surface 3b, such as to enable the device to be inserted with a forced fit.

The two parts 7a, 7b of the bifurcate device are fixed in relation to one another, either integrated in accordance with FIG. 4, or with the aid of a clamping device 8, in accordance with FIG. 5.

Referring particularly to FIG. 5, it will be seen that the parts 7a, 7b of the bifurcate device each have an L-shape, wherein one leg 7a and 7b of each part 7a, 7b is intended for coaction with the edge region 3b of the raw material 3 or the groove 6b and respective other legs 7c and 7d are intended for coaction with one another, through the medium of serrations or the like, and a known fastener or clamping device 8.

The serrations on the part 7d have been referenced 7d' and are intended to coact with corresponding serrations on the part 7c.

A generally U-shaped member 9 functions to hold the bifurcate device 7 firmly adjacent the parting tool 5, 6.

Figure 6:
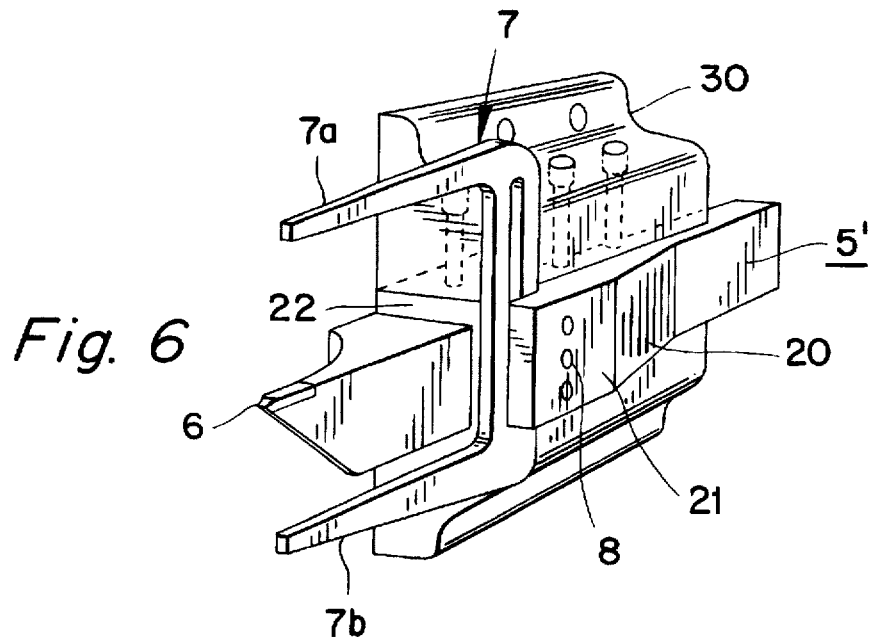
FIG. 6 is a perspective view of a front part of a tool arrangement according to a third embodiment in which the bifurcate device is also comprised of a unit which is firmly attached to the parting tool but which can be readily removed therefrom.

FIG. 6 illustrates an alternative embodiment wherein the bifurcate device 7 includes two legs 7a, 7b which are secured to a holder 20 by means of a fastener device 8.

Figure 9:
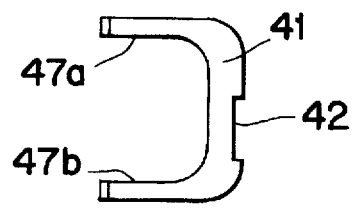
FIG. 9 is a side view of the leg part of the bifurcated device shown in FIG. 7.

The bifurcate device 7 may also hold one single U-shaped part via the holder 20 (see FIG. 9). The holder 20 is angled with a part 21 provided with the clamping or fastening device 8 and a part 22 which rests on the upper surface of the shaft 5' of the parting tool.

Both the parting tool 5, 6 and the holder 20 can be firmly clamped together, through the medium of the part 22, in a tool mount 30 of known construction.

Figure 7:
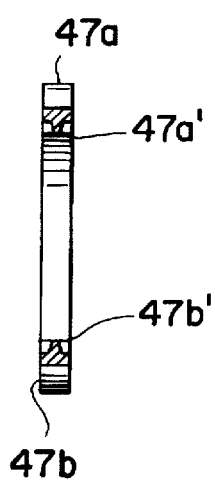
FIG. 7 is a front view of one leg part of a bifurcate device.
Figure 8:
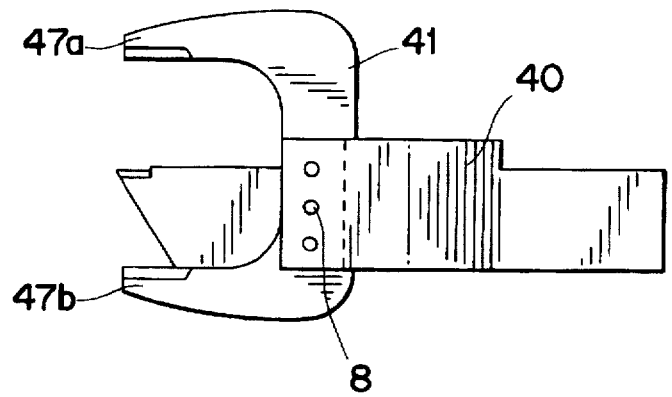
FIG. 8 is a side view of a further embodiment of a tool arrangement which includes the leg part shown in FIG. 7.

FIGS. 7–9 illustrate a further embodiment of a holder 40 provided with a clamping or fastening device 8 for a fixed U-shaped leg part 41, wherein the surfaces 47a' and 47b' of legs 47a and 47b are angled in cross-section.

FIG. 9 shows a groove 42 which is intended for coaction with the holder 40 in a predetermined position.

There is nothing to prevent the groove 42 from being centered and therewith raise the clamping device 8. This will result in the part 22 being located more centrally on the part 21.

Figure 3:
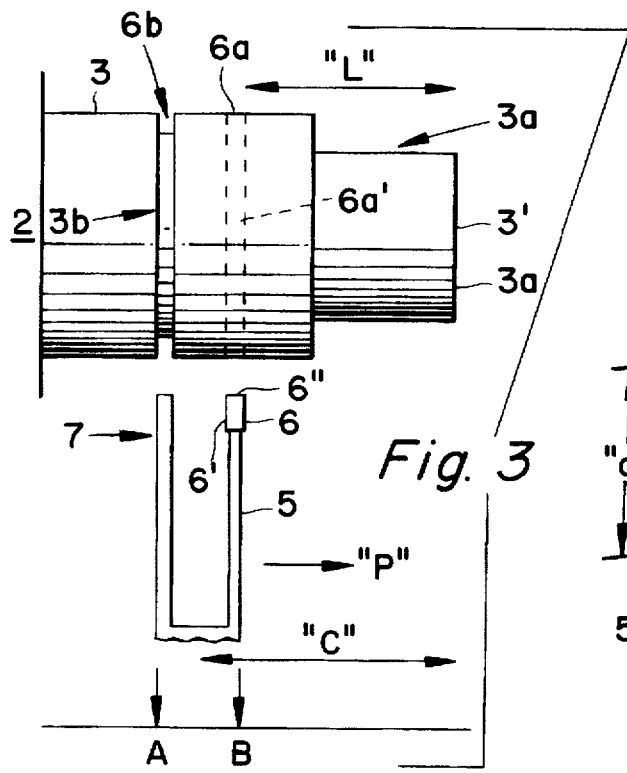
FIG. 3 illustrates the machined section from above and shows a parting tool positioned for parting the machined section from the raw material, and also shows a bifurcate device which is located adjacent a groove earlier formed by the parting tool.

The present invention also relates to a first method of moving raw material 3 which is held firmly in a holding device 2 but which is loosened in conjunction with said movement to a chosen working position (shown in FIG. 3) where a parting tool 5, 6 is intended to cut-off a machined section 3a having a length "L". This is illustrated in FIG. 3 with the use of a tool arrangement according to FIG. 4,5,6 or 8.

In the case of this first embodiment of an inventive method, the parting tool 6 is moved perpendicularly to a position "a" in which the tool is moved towards the axially extending center line 3' and the cutting edge 6" cuts a groove 6b in the raw material 3.

The groove 6b is thus orientated adjacent a cutting-off section 6a and the distance is so adapted that when the tool 6 is moved to the position "b" the bifurcate device 7 will be in line with the groove 6b.

After the cutting-off process has advanced to an extent in which the groove 6a loosens the machined section 3a, the parting tool and the bifurcate device are moved further in the same direction, after having stopped rotation of the raw material, so as to bring the bifurcate device 7 into desired coaction with the raw material 3. With the parting tool 6 and the bifurcate device 7 held in position, the raw material 3 is now loosened from the holding device or the chuck 2, whereafter the bifurcate device and the parting tool are moved axially away from the chuck 2 though a distance "C" so as to bring the edge part 6a' into line with the earlier edge part 3a', or possibly slightly beyond this position, whereafter the raw material 3 is again clamped firmly by the chuck 2 with the raw material 3 now located in its chosen position.

It should be noted that the parting tool 5, 6 can be caused to cut the groove 6b to different depths and that a groove of this configuration will be removed as surface material when machining each section 3a.

The invention also relates to a second method of moving raw material 3 held by a holding device 2 without needing to form a groove 6b.

This is effected by causing a bifurcate device 7 to coact with the peripheral surface of the raw material 3 adjacent the groove 6b or even within the groove 6b during a cutting-off process with the aid of the parting tool 5, 6. When the cutting-off process has been completed of the raw material 3 has ceased to rotate, the parting tool and the bifurcate device are moved further in the same direction so as to bring the bifurcate device 7 into desired coaction with the raw material 3.

The common movement of the bifurcate device 7 and the parting tool 6 beyond the center 3' will cause the bifurcate device to be clamped firmly in this position by virtue of the press fit that now exists between the parts 7a and 7b of the bifurcate device, particularly between the surfaces 7a' and 7b' of said parts, and the peripheral surface of the raw material 3.

In the case of this application, the set distance between mutually opposed surfaces 7a', 7b' of the bifurcate device will be only slightly smaller than the distance between the separated surface parts assigned to the raw material (or to the groove) and therewith provide a squeezing action between the bifurcate and the raw material such that said material will accompany the bifurcate device and the parting tool in their common movement away from the chuck 2.

It will be understood that the invention is not restricted to the aforedescribed and illustrated exemplifying embodiment thereof and that modifications can be made within the scope of the inventive concept as illustrated in the following claims.

I claim:

1. A tool arrangement comprising:

a parting tool for separating a machined section from a raw material held firmly in a holding device by rotating at least one of the parting tool and the raw material while moving the parting tool in relation to the raw material towards an axially extending center line of e rotary movement and therewith cut a groove between the machined section and the raw material, a bifurcate device located adjacent said parting tool on the side thereof that is proximal to the raw material, the bifurcate device being movable in relation to the raw material towards the axially extending center line of the rotary movement for coacting with an edge region of the raw material such that as at least one of the parting tool and bifurcate device moves axially a given length, the raw material will be withdrawn from the holding device, wherein said bifurcate device includes two device parts having mutually opposing planar surfaces , said two device parts being spaced apart a predetermined distance.

2. An arrangement according to claim 1, wherein the predetermined distance is selected to provide a press fit between the surfaces of the device parts and a periphery of the raw material.

3. An arrangement according to claim 2, wherein said predetermined distance provides a press fit between the surfaces of the device parts and diametrically arranged surface parts belonging to a groove formed in the raw material.

4. An arrangement according to claim 1, wherein said predetermined distance is selected to provide a press fit between the surfaces of the device parts and diametrally arranged surface parts belonging to a groove in the raw material.

5. An arrangement according to claim 1, wherein said predetermined distance is selected to provide for a coaction between the device parts of the bifurcate device and an edge part of the raw material that lies proximal to the machined section.

6. An arrangement according to claim 1, wherein the bifurcate device comprises a removable unit attached to the parting tool.

7. An arrangement according to claim 1, wherein the bifurcate device has the form of a unit which is integrated with the parting tool and which includes a fixed generally U-shaped part.

8. An arrangement according to claim 1, wherein the two parts belonging to the bifurcate device are adjustable away from and towards each other.

9. An arrangement according to claim 8, wherein each of said parts of the bifurcate device has a L-shape, one leg of each part intended for a coaction with the edge region of the raw material and respective other legs intended for coaction with one another through the medium of serrations and with the aid of a clamping means.

10. An arrangement according to claim 1, wherein the predetermined distance between the two mutually facing surfaces of the device parts of the bifurcate device can be adjusted to a value which is smaller than an outer dimension of the raw material.

11. An arrangement according to claim 1, wherein the two device parts of the bifurcate device are fixed relative to one another in the form of a unit.

12. An arrangement according to claim 1, wherein each of said device parts of the bifurcate device has a L-shape, one leg of each part intended for coaction with the edge region of the raw material and respective other legs intended for coaction with one another through the medium of serrations and with the aid of a clamping means.

13. An arrangement according to claim 1, wherein the bifurcate device comprises a unit which is integrated with the parting tool.

14. An arrangement according to claim 1 wherein said parting tool comprises a means for separating the machined section from the raw material and a means for cutting a bifurcate engaging groove in the raw material prior to separating the machined section therefrom.

15. An arrangement according to claim 1 wherein said bifurcate device engages the groove between the machined section and the raw material, the raw material thereby being withdrawn from the holding device upon common axial movement of the parting tool and the bifurcate device.

16. A method of moving raw material held firmly in a holding device from a held position at which a parting tool is intended to cutoff a machined section to a chosen working position, said method comprising the steps of:

causing a bifurcate device to move into coaction with a peripheral surface of the raw material during a cutting-off process with the aid of the parting tool;

bringing the bifurcate device into coaction with the raw material upon completion of the cutting-off process;

loosening the raw material from the holding device;

bringing the raw material to an intended position through the medium of a common axial movement of the bifurcate device and the parting tool; and firmly clamping the raw material in the intended position.

17. A method according to claim 12 comprising the steps of:

forming a groove in the raw material to define the peripheral surface of the raw material and adapting the thus formed groove for coaction with the bifurcate device.

18. A method according to claim 11, further comprising adapting a predetermined distance between mutually opposing surfaces of the bifurcate device to a value which is only slightly smaller than the distance between diametrically arranged surface parts of at least one of the raw material and the groove, so as to provide a clamping effect between the bifurcate device and the raw material such that the raw material will accompany the bifurcate device and the parting tool in their common axial movement.

* * * * *